United States Patent [19]

Porter

[11] Patent Number: 5,090,628

[45] Date of Patent: Feb. 25, 1992

[54] CHIP CRUSHER

[75] Inventor: Ronald J. Porter, Reno, Nev.

[73] Assignee: Sierra Machinery, Inc., Sparks, Nev.

[21] Appl. No.: 475,654

[22] Filed: Feb. 6, 1990

[51] Int. Cl.[5] .......................... B02C 19/00; B02C 4/08
[52] U.S. Cl. ......................................... 241/36; 241/65;
  241/100; 241/101.4; 241/236
[58] Field of Search ................ 69/9.3; 29/90.01, 90.5,
  29/90.6; 241/101.2, 3, 100, 36, 236, 65, 25,
  101.4, 35, 152 R

[56] References Cited

U.S. PATENT DOCUMENTS

| | | | |
|---|---|---|---|
| 2,418,990 | 4/1947 | Sheldon | 241/152 RX |
| 2,453,008 | 11/1948 | Fowler | 241/101.4 |
| 4,377,259 | 3/1983 | Areaux et al. | 241/236 X |
| 4,580,963 | 4/1986 | Yoshida et al. | 241/101.4 X |
| 4,744,531 | 5/1988 | Hasenkamp | 241/101.2 |
| 4,793,561 | 12/1988 | Burda | 241/101.2 X |
| 4,883,418 | 11/1989 | Hehl | 241/101.4 X |
| 4,919,345 | 4/1990 | Burlington et al. | 241/101.2 X |

FOREIGN PATENT DOCUMENTS

| | | | |
|---|---|---|---|
| 0074148 | 3/1986 | European Pat. Off. | 241/236 |
| 1477731 | 3/1969 | Fed. Rep. of Germany . | |
| 2048260 | 4/1972 | Fed. Rep. of Germany . | |
| 1250324 | 8/1986 | U.S.S.R. | 241/236 |
| 707551 | 4/1954 | United Kingdom . | |

OTHER PUBLICATIONS

Soviet Inventions Illustrated, P, Q sections, week C 33, Sep. 24, 1980, Derwent Publications Ltd., London, p. 54 (SU-706 197 (NIKO).
Soviet Inventions Illustrated, P,Q sections, week 8709, Apr. 15, 1987, Derwent Publications Ltd., London, p. 54 (SU-1242-308 (DEUY)).
Soviet Inventions Illustrated, p, Q sections, week 8647, Jan. 7, 1987, Derwent Publications Ltd., London, p. 56 (SU-1140-363 (MALA)).

*Primary Examiner*—Mark Rosenbaum
*Attorney, Agent, or Firm*—Townsend and Townsend

[57] ABSTRACT

A device for skiving and roller burnishing a workpiece (6) including a cutter (8) and a chip crusher (14) for crushing strings of chips (10). The crusher is positioned beneath the cutter such that low pressure coolant directs the chips from the end (12) of the workpiece and cutter directly into the crusher. The crusher includes rolls (26, 28) having a plurality of teeth (30) for pulling the strings of chips through the crusher.

11 Claims, 3 Drawing Sheets

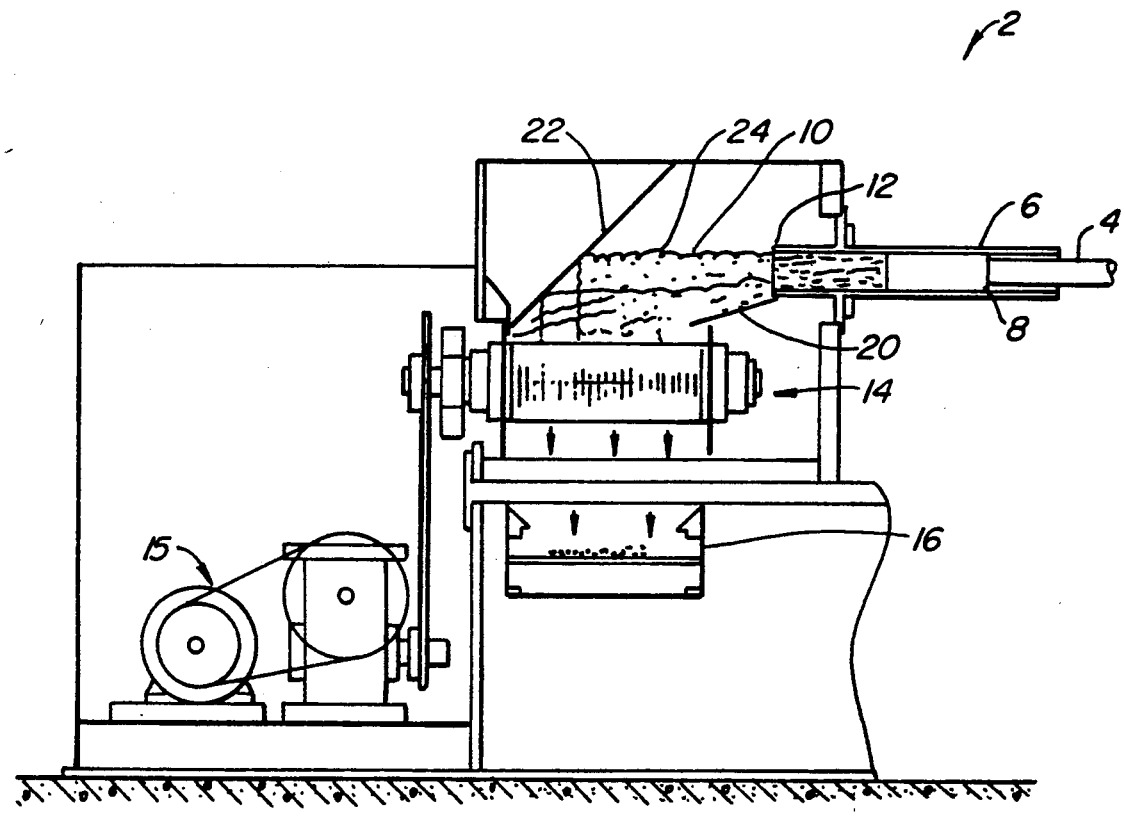
FIG._1.
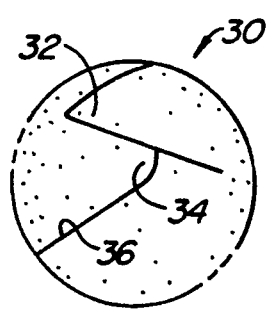
FIG._3.

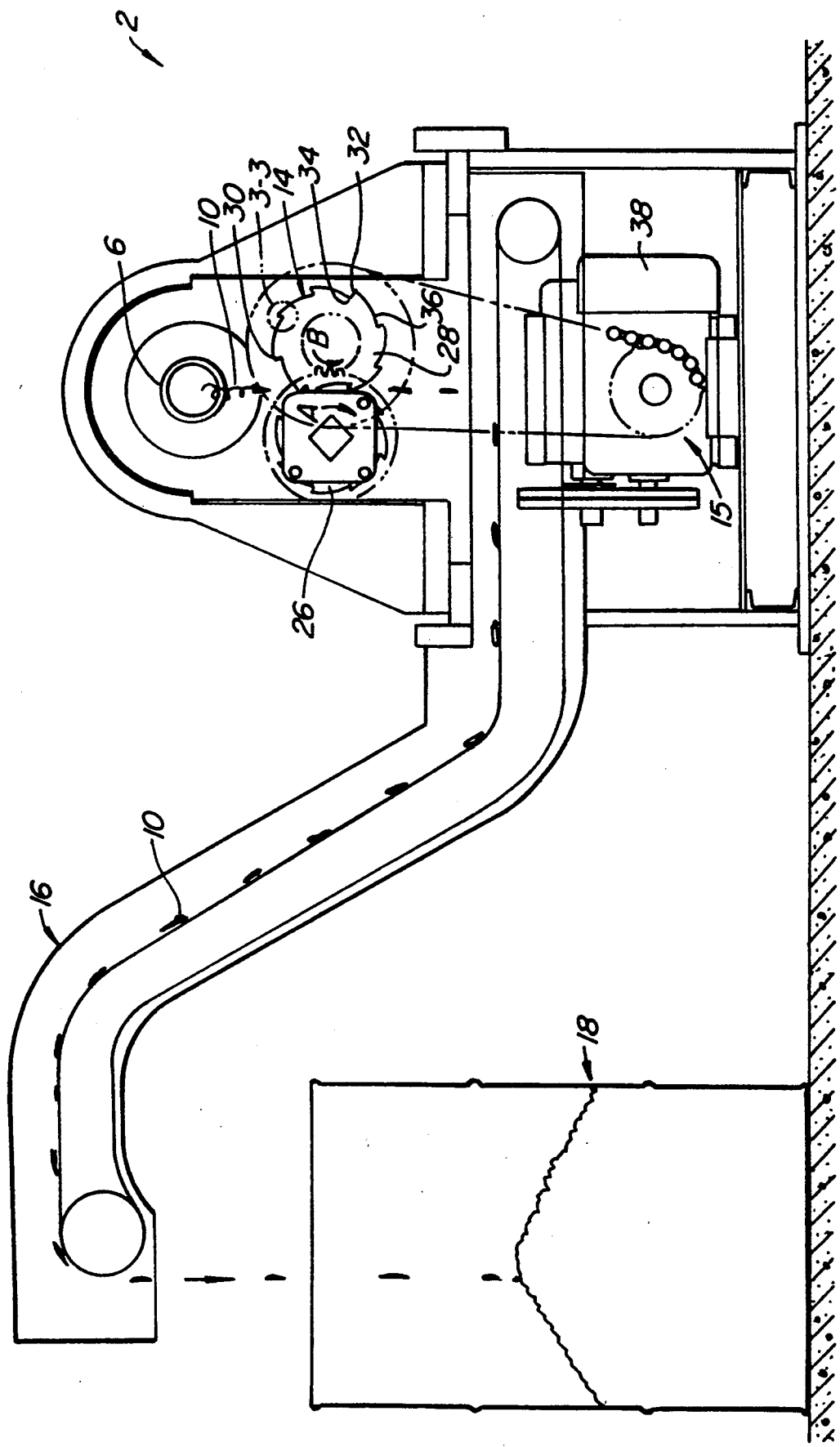
FIG._2.

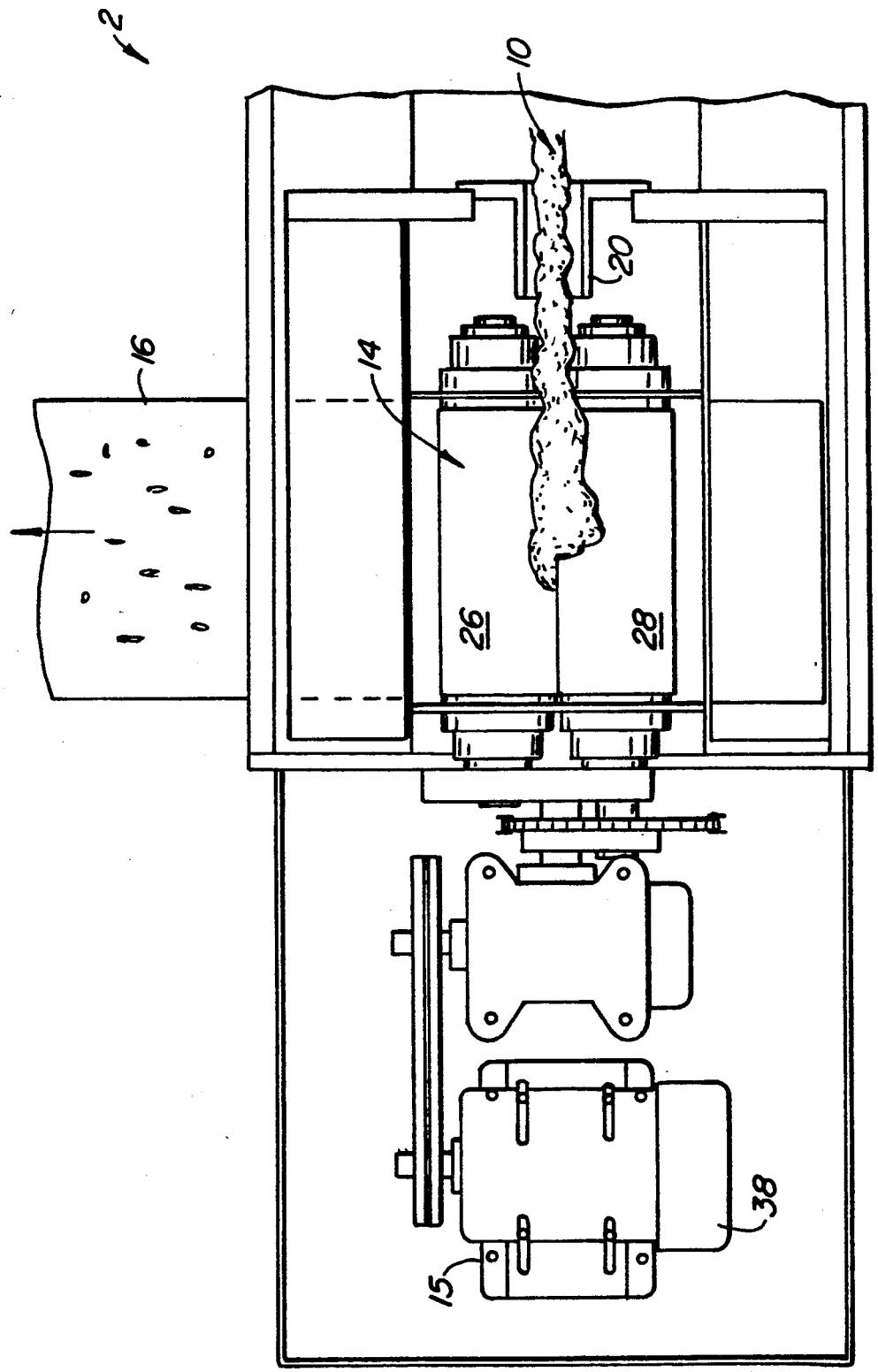
FIG._4.

CHIP CRUSHER

BACKGROUND OF THE INVENTION

The present invention relates to a device for skiving and roller burnishing a work piece.

Skiving tools are usually used to accurately cut small quantities of material from the inner wall of a cylindrical hole. The skiving tool first cuts or shaves off a small amount of material, normally between 0.020 and 0.040 inch on the diameter, from the hole and then a roller burnishing tool, burnishes the hole to a smooth finish.

During skiving operations, scrap in the form of "chips" is produced. These chips may be in the form of a long flat ribbon-like string or small pieces. Strings of chips are difficult to handle. They may become entangled with each other or wrap around the chip conveyor, making it difficult for removal by the chip conveyor from the machine. It is also common for strings of chips to accumulate in the exit chamber of the device resulting in overloading, jamming or damage to the conveyor.

It is generally necessary to provide manual intervention to move strings of chips from a conveyor into a container. To avoid handling strings of chips, some skiving and roller burnishing devices are designed to produce chips having a small cross-section and length by using an assortment of various size interchangeable carbide chipbreakers. This is a major disadvantage when machining workpieces, such as hydraulic cylinders with oil port holes. These small chips can enter these openings and then fall into the rollers or pads on the skiving, roller burnishing tool, thus causing damage to both the tool and workpiece. When this occurs the workpiece is rendered unusable. Also a much higher coolant pressure is required to force this small chip ahead of the tool and from workpiece.

In some skiving and roller burnishing devices, such as employed by the assignee of the present invention, the skiving and roller burnishing device is designed to cut a greater mass, up to 0.5 inch on diameter, at a faster rate than other cutting devices while still maintaining the precision machining related to skiving and roller burnishing. However, it is common to produce chips in the assignee's skiving and roller burnishing devices having a flat ribbon-like configuration, greater surface area and dimensions of 0.375–0.750 inch wide and 0.010–0.015 inch thick. Thus, the chips produced by the assignee's device must be in the form of long strings which cannot be easily broken by a carbide chipbreaker.

SUMMARY OF THE INVENTION

The present invention is directed to a skiving and roller burnishing device for processing long, massive strings of chips. By providing a crusher as an integral part of the skiving and roller burnishing device, the long strings of chips are easily manipulated and drawbacks previously encountered are avoided. The crusher is juxtapositioned beneath the cutter. In this way, the long strings of chips are forced from the workpiece by low pressure coolant directly into the crusher. After crushing, the chips are easily moved along a conveyor to a receptacle for holding the crushed chips.

In the preferred embodiment, the crusher includes rolls for crushing the chips. Teeth have a lip and a groove are formed on each side of the rolls. The chips are caught by the lips within the grooves such that as the rolls rotate, the chips are grasped and pulled from the workpiece and burnishing tool and through the crusher.

As the chips are discharged from the cutter, they are directed by a chip delivery chute into the crusher. The chip delivery chute extends between the outer end of the workpiece and the entrance to the crusher. A deflector guides the chips into the crusher. It is preferably spaced from the cutter opposite the workpiece, angled upwardly from the crusher toward the cutter.

A motor operates the crusher. In the preferred embodiment, a programmable controller is connected to a current sensing relay wired in series with the motor for sensing peak current and relaying the data for quickly stopping or reversing the device, protecting the crusher from damage.

In the present invention, manual intervention to move the mass of chips from the chip conveyor to a crusher is eliminated, thus removing a major hazard for the machine operator. Additionally, because control of the type of chip is no longer necessary, variability of feed rate and RPM of the tool results in maximum tool life and the ability to produce a wide range of surface finishes. Power consumption is reduced over previous designs, because the chip crusher is constantly pulling and crushing smaller amounts of chips at a uniform rate, rather than receiving a large mass of chips at one time. The chips produced are thinner than those produced by the prior art and have a greater surface area, allowing the coolant to be more effective. The coolant pressure required to flush the chips is considerably reduced to between 10 and 100 psi, reducing the likelihood of high pressure coolant leaks and ensuring a safer environment. Furthermore, longer strings of chips preclude entry into openings of workpieces, rendering the workpiece fabricated by the prior art devices unusable.

BRIEF DESCRIPTION OF THE DRAWINGS

FIG. 1 is a front side view of the present invention;
FIG. 2 is an end view;
FIG. 3 is an enlarged view of a crusher tooth, taken along lines 3—3 of FIG. 2; and
FIG. 4 is top view thereof.

DETAILED DESCRIPTION OF THE PREFERRED EMBODIMENT

Referring now to FIG. 1, the overall structure of the skiving and roller burnishing device 2 will be described. Boring bar 4 moves through workpiece 6 such that cutter 8 skives the inner wall of workpiece 6. Strings of chips 10 flow through until the end 12 of workpiece 6 and are pulled to crusher 14. Crusher 14 is juxtaposed beneath end 12 of the workpiece and is formed as an integral part of skiving and roller burnishing device 2. From crusher 14, chips 10 are moved along conveyor 16 to a container 18, as seen in FIG. 2.

A chip delivery chute 20 is disposed beneath cutter 8 between end 12 of workpiece 6 and crusher 14, retaining and directing chips 10 into crusher 14. Chips 10 exit end 12 of workpiece 6 during the skiving operations. A deflector plate 22 is spaced laterally from cutter 8 adjacent to and above crusher 14, guiding chips 10 into crusher 14. A low pressure coolant 24 forces chips 10 into crusher 14 to begin the pulling action by crusher 14. By producing long strings of chips 10, a thinner, lighter chip results having increased surface area effectively acted on by coolant 24. The coolant pressure required to move chips 10 toward end 12 of workpiece 6 is reduced to between 10 and 100 psi.

Turning now to FIG. 2, crusher 14 includes a drive motor 15 for rotating rolls 26, 28. Rolls 26, 28 engage chips 10 as the rolls rotate in the direction of Arrows A, B, respectively. Each roll 26, 28 has a plurality of teeth 30 for grasping and pulling chips 10 into crusher 14 for shredding. Teeth 30, as seen most clearly in FIG. 3, include a long, high-hooked lip 32 extending upwardly from rolls 26, 28 in the direction of rotation of the rolls. A groove 34 is formed between lip 32 and the outer periphery 36 of rolls 26, 28. As chips 10 are produced and dispensed from workpiece 6, they are gripped within grooves 34 and pulled through the crusher 14 directly from the workpiece. After crushing, chips 10 continue on their path onto conveyor 16 and into container 18.

Drive motor 15 includes a peak current sensing relay 38 disposed in series with the drive motor. The programmable controller can quickly stop or reverse the operation of crusher 14 in the event teeth 30 pull chips 10 too hard for machining conditions. Additionally, peak current sensing relay 38 protects crusher 14 from damage should foreign objects such as large solids be introduced into it.

The operation of skiving and roller burnishing device 2 will now be described. Workpiece 6 is placed in position such that its inner surface receives boring bar 4 and cutter 8 for skiving operations. Chips 10 exit end 12 of workpiece 6 and are pulled through chip delivery chute 20 to crusher 14. Low pressure coolant 24 forces chips 10 toward deflector plate 22 and into rolls 26, 28 of crusher 14 to begin the pulling action by the crusher. Chips 10 are crushed by teeth 30, exit crusher 14 to conveyor 16 and into container 18.

Although the present invention includes a programmable controller to provide a peak current sensing relay in series with the motor, other characteristics of the device may be monitored. An alternative chip delivery means may be employed, so long as the crusher is juxtaposed with the end of the workpiece and cutter. This invention has been described with reference to the preferred embodiment. Variations and modifications can be made without departing from the scope of the present invention which is limited only by the following claims.

What is claimed is:

1. A device for performing skiving operations on a hollow cylinder and crushing the chips formed by said skiving operation, said device comprising:
    a cutter for performing skiving operations on the interior of the hollow cylinder wherein strings of chips are discharged from an open end of the hollow cylinder;
    a crusher formed as an integral part of the device and disposed in juxtaposition to and beneath said open end of the hollow cylinder to receive said chips from the cutter;
    means located proximate said open end of the hollow cylinder to receive said chips from the cutter;
    means located proximate said open end of the hollow cylinder for guiding the chips from the open end of the hollow cylinder into the crusher;
    means formed in said crusher for grasping the chips from said cutter and pulling said chips through said crusher; and
    means for moving the crushed chips from said crusher to a receptacle.

2. The device as defined by claim 1 wherein the cutter includes means for dispensing a low pressure coolant, and wherein the coolant flowing from said end of the hollow cylinder directs the chips into the crusher.

3. The device as defined by claim 1 wherein the crusher includes crushing rolls, and wherein the grasping means includes teeth located on the crushing rolls for grasping the chips from said cutter as said rolls rotate.

4. The device as defined by claim 3 wherein the teeth each include a lip and a groove for grasping the chips.

5. The device as defined by claim 3 and further comprising a motor for rotating said rolls and a programmable controller monitoring said motor for sensing peak current of said motor to limit the pulling force on said chips.

6. The device as defined by claim 1 wherein the guiding means includes a chute for guiding the chips from said end of the hollow cylinder into the crusher.

7. The device as defined by claim 6 wherein the chute includes an inclined deflector plate for deflecting long strings of chips into the crusher.

8. A device for performing skiving operations on a hollow cylinder and crushing the chips formed by said skiving operation, said device comprising:
    a cutter for performing skiving operations on the interior of a hollow cylinder and dispensing a coolant so that strings of chips are discharged from an open end of the hollow cylinder entrained in the coolant;
    a crusher formed as an integral part of the device and disposed in juxtaposition to and beneath said open end of the hollow cylinder, said crusher including crushing rolls having teeth located thereon to receive said chips from the cutter, grasp the chips and pull said chips into the crusher as the rolls rotate;
    an inclined deflector plate located proximate said open end of the hollow cylinder to direct the chips to the rolls of the crusher; and
    means for moving the crushed chips from said crusher to a receptacle.

9. The device as defined by claim 8 and additionally comprising a chute for guiding the chips to the rolls of the crusher, the deflector plate being an integral part of the chute.

10. The device as defined by claim 8 and further comprising a motor for rotating said rolls and a programmable controller monitoring said motor for sensing peak current of said motor to limit the pulling force on said chips.

11. The device as defined by claim 8 wherein the moving means comprises a conveyor.

* * * * *